United States Patent [19]
Yamaguchi et al.

[11] Patent Number: 5,744,890
[45] Date of Patent: Apr. 28, 1998

[54] BRUSH STRUCTURE FOR MOTOR IN WHICH WEAR-RELATED PARAMETERS OF THE BRUSHES ARE VARIED TO EQUALIZE BRUSH WEAR

[75] Inventors: Mineo Yamaguchi, Kosai; Takayuki Kitagawa, Toyohashi, both of Japan

[73] Assignee: ASMO Co., Ltd., Kosai, Japan

[21] Appl. No.: 634,230

[22] Filed: Apr. 18, 1996

[30] Foreign Application Priority Data

Jul. 5, 1995  [JP]  Japan .................. 7-170005

[51] Int. Cl.$^6$ .................. H02K 13/00; H02P 7/06
[52] U.S. Cl. .................. 310/248; 310/245; 310/251; 310/252
[58] Field of Search .................. 310/248, 239, 310/245, 251, 252, 253, 242, 247

[56] References Cited

U.S. PATENT DOCUMENTS

| | | | |
|---|---|---|---|
| 4,225,798 | 9/1980 | Barrett | 310/154 |
| 4,314,848 | 2/1982 | Todoroki et al. | 75/173 C |
| 4,799,957 | 1/1989 | Vogel | 75/243 |
| 4,845,396 | 7/1989 | Huber | 310/68 R |
| 4,910,790 | 3/1990 | Kershaw | 388/836 |
| 5,227,688 | 7/1993 | Gotoh | 310/239 |
| 5,311,615 | 5/1994 | Couëtoux | 388/836 |
| 5,485,049 | 1/1996 | Shannon et al. | 310/248 |

FOREIGN PATENT DOCUMENTS

| | | |
|---|---|---|
| 2658962 | 2/1990 | France .................. 310/248 |
| 59-47297 | 3/1984 | Japan . |
| 3-7665 | 1/1991 | Japan . |
| 4-80271 | 7/1992 | Japan . |
| 4-56557 | 9/1992 | Japan . |

*Primary Examiner*—Steven L. Stephan
*Assistant Examiner*—Tran N. Nguyen
*Attorney, Agent, or Firm*—Burns, Doane, Swecker & Mathis, LLP

[57] ABSTRACT

A brush structure for a motor is provided for realizing an equalization of wear of brushes without causing an early wear of a specific brush while not necessitating a complicated conduction controlling device. A first brush, which is one of four brushes, conducted at both Lo mode and Me mode is formed to have a larger sliding contact area for contacting a commutator slidably compared with a sliding contact area of a second brush which is conducted at Hi mode only. Current density in the first brush at Lo mode and Me mode becomes smaller than current density at Hi mode.

20 Claims, 3 Drawing Sheets

BRUSH STRUCTURE FOR MOTOR IN WHICH WEAR-RELATED PARAMETERS OF THE BRUSHES ARE VARIED TO EQUALIZE BRUSH WEAR

CROSS REFERENCE TO RELATED APPLICATIONS

The present application is based on and claims priority from Japanese Patent Application Hei 7-170005, filed on Jul. 5, 1995, the content of which is incorporated herein by reference.

BACKGROUND OF THE INVENTION

1. Field of the Invention

The present invention generally relates to a brush structure for a motor, and more specifically relates to a brush structure for a motor of which rotational speed is controlled by way of changing the number of current carrying brushes.

2. Description of Related Art

Recently a cooling fan of a radiator for an automobile is driven by a DC electric motor connected to a battery as a power source. The cooling fan is designed to change its rotational speed in accordance with heating level of an engine. Therefore, it is imperative to have a motor speed controlling method comprised of a simple structure.

A series resistance control is known as a simple speed controlling method of the DC electric motor. This controlling method is to arrange a series resistance between the battery and an armature circuit. An adjustment of voltage impressed onto the armature is completed by way of modifying the resistance value. In order to put this method into practice, it is only necessary to arrange a plurality of resistances having different resistance values in a control circuit of the motor and to connect one of them to the armature circuit by changing over these resistances. Therefore, it is possible to change the motor speed in a range of several levels by utilizing this simple structure.

However, since power loss of the resistances connected in series is large in this series resistance control, an operation efficiency deteriorates. Waste of electric power consumption becomes a problem especially when the battery is used as the power source. Since an amount of heat generated by the resistor becomes large in accordance with the power loss, a spacious area to treat the generated heat in the control circuit is necessitated. Therefore, this control circuit in a limited space of the automobile is not desirable.

A rotational speed controlling method for a motor comprised of a simple structure solving this type of problem is proposed in JP-B2-4-56557. In this controlling method, the motor has a multiple-pole multiple-brush structure and the number of brushes to be connected to a power source is varied in accordance with a necessary rotational speed. When the number of brushes which the power is supplied to varies, a structure of a circuit formed by armature coils comprising an armature winding and conducted by the brushes also changes. Therefore, an armature coil circuit resistance (an armature resistance) varies in accordance with the number of the brushes conducted. In a DC motor, a relation between torque and rotational speed is negative proportion and its proportional constant is in proportion to the armature resistance. Therefore, when the armature resistance is varied according to the number of brushes connected, a torque-rotational speed characteristics changes. In other words, the larger the number of current carrying brushes becomes, the smaller the armature resistance becomes and the larger the rotational speed against the torque becomes. As a result, by changing the number of current carrying brushes, a changing-over of the rotational speed of the cooling fan or the like in a range of several levels becomes possible.

According to this rotational speed controlling method using the relatively simple construction which provides switches between each brush and the power source respectively and controls connection/disconnection of each switch in accordance with a required rotational speed in the range of several levels, the controlling of the rotational speed can be done easily. Since there is no resistance to adjust voltage to be impressed onto the armature, waste of power consumption and heat generation are eliminated.

However, in this controlling method, when the number of conducted brushes is reduced, current flow to the specifically conducted brushes becomes large compared with current flow to the brushes conducted when all brushes are conducted. In a case of a quadruple-brush, for example, when only three brushes are conducted, current value becomes about 1.6 times larger and, when only two brushes are conducted, the current value of the brushes becomes about 1.4 times larger than the current value of the conducted brushes at the time of maximum rotational speed. As a result, current density of the current flow to the specifically conducted brushes becomes large and temperature of the specifically conducted brushes rises higher than temperature of the conducted brushes due to power loss at the time of the maximum rotational speed. Then, wear of the specifically conducted brushes is accelerated compared with wear of the conducted brushes at the time of the maximum rotational speed. As a result, wear speed of the specifically conducted brushes is faster than that of the brush to which the current flows at the time of the maximum rotational speed only. Therefore, when all brushes have the same configuration and the motor is driven under the maximum rotational speed frequently, the motor might become inoperable in a shorter life due to the wear of the specific brushes.

In the automobile, an effective life of the motor is set longer than that of the automobile itself in order to save a user's future cost brought by replacement or repair of the motor. On the other hand, it is required to design the effective life of the motor relative to the effective life of the automobile so as to avoid unnecessary production cost brought by providing functions with each part of the motor more than necessary. Therefore, it is imperative to prevent a short life of the motor caused by an early wear of the specific brushes and at the same time to equalize the effective lives of the brushes.

In order to avoid this kind of problem, a method of preventing the early wear of the specific brushes, by selecting the necessary number of current carrying brushes at random, whenever the number of the current carrying brushes is regulated, is proposed in the afore-mentioned publication. In short, when the motor is driven with the selected number of current carrying brushes, switches of the selected brushes are controlled to connect and disconnect to/from a connecting portion of each brush by a switch controlling device for selecting the necessary number of current carrying brushes at random. As a result, since no brush is specifically picked up for the conduction always when the number of the current carrying brushes is regulated, the early wear of the specific brushes is prevented.

U.S. Pat. No. 5,311,615 discloses a similar method to the above method, in which the current carrying brushes are selected by turns by a logic control unit when the number of the current carrying brushes is regulated.

However, since a relatively higher-level controlling is required in the above-mentioned switch controlling device or logic control unit, the structures of these become complicated by introducing a microcomputer or the like. Therefore, it is costly as a controlling device for regulating the rotational speed of the cooling fan, and these methods were not taken into practice actually in view of the cost-effectiveness.

SUMMARY OF THE INVENTION

In the light of the above-described problems, a primary object of the present invention is to provide a brush structure for a motor preventing an early wear of a specific brush by equalizing wear of brushes without using a complicated conduction controlling device.

According to a first aspect of the present invention, either a sliding contact area of a first brush or sliding contact areas of the first brush as well as second brushes which are connected when the number of connected brushes is regulated is set larger compared with a sliding contact area of one of the second brushes which is connected only when all second brushes are connected. Then, current density of the first brush or of the first brush as well as the second brushes which are connected when the number of connected brushes is regulated becomes smaller compared with current density of the second brush which is connected only when all second brushes are connected. As a result, temperature of the first brush or temperature of the first brush as well as the second brushes which are connected when the number of connected brushes is regulated becomes lower compared with temperature of the second brush which is connected only when all second brushes are connected. Therefore, wear speed of the first brush or of the first brush as well as the second brushes which are connected when the number of connected brushes is regulated is repressed compared with wear speed of the second brush which is connected only when all second brushes are connected, and thus an effective life of the first brush or of the first brush as well as the second brushes which are connected when the number of connected brushes is regulated becomes longer compared with the effective life of the second brush which is connected only when all second brushes are connected. Therefore, in the use of the motor including the circumstances that the number of the second brushes is regulated and not regulated, the effective life of the first brush or of the first brush as well as the second brushes which are connected when the number of connected brushes is regulated is equalized with the effective life of the second brush connected only when all second brushes are connected.

According to a second aspect of the present invention, an effective wear length of a first brush or of the first brush as well as second brushes which are connected when the number of connected brushes is regulated is set longer compared with an effective wear length of one of the second brushes connected only when all second brushes are connected. As a result, the effective life of the first brush or of the first brush as well as the second brushes connected when the number of connected brushes is regulated is longer compared with the effective life of the second brushes connected only when all second brushes are connected.

Therefore, in the use of the motor including the circumstances that the number of the second brushes is regulated and not regulated, the effective life of the first brush or of the first brush as well as the second brushes connected when the number of connected brushes is regulated is equalized with the effective life of the second brush connected only when all second brushes are connected.

According to a third aspect of the present invention, a specific resistance of a first brush or of the first brush as well as second brushes which are connected when the number of connected brushes is regulated is set larger than a specific resistance of one of the second brushes connected only when all second brushes are connected. As a result, contact resistance of the first brush with a commutator or of the first brush as well as the second brushes which are connected when the number of connected brushes is regulated with the commutator becomes larger compared with the contact resistance of the second brush connected only when all second brushes are connected. Therefore, a resistance commutation is made at the commutator energized and sparks produced between the commutator and the first brush or and the first brush as well as the second brushes which are connected when the number of connected brushes is regulated, becomes lesser compared with sparks produced between the commutator and the second brush connected only when all second brushes are connected. Due to this, the wear speed caused by sparks of the first brush or the first brush as well as the second brushes which are connected when the number of connected brushes is regulated becomes slower compared with the wear speed of the second brush which is connected only when all second brushes are connected. As a result, the effective life of the first brush or of the first brush and the second brushes which are connected when the number of connected brushes is regulated becomes longer compared with the effective life of the second brush connected only when all second brushes are connected. Therefore, in the use of the motor including the circumstances that the number of the second brushes is regulated and not regulated, the effective life of the first brush or of the first brush as well as the second brushes which are connected when the number of connected brushes is regulated is equalized with the effective life of the second brush connected only when all second brushes are connected.

BRIEF DESCRIPTION OF THE DRAWINGS

Additional objects and advantages of the present invention will become more readily apparent from the following detailed description of the preferred embodiments of the several embodiments hereof, when taken together with the appended claims and attached drawings, all of which form a part of this application. In the drawings:

DETAILED DESCRIPTION OF THE PREFERRED EMBODIMENTS (First Embodiment)

A first embodiment realizing the present invention will be explained based on FIG. 1 through FIG. 3.

Figure 1:
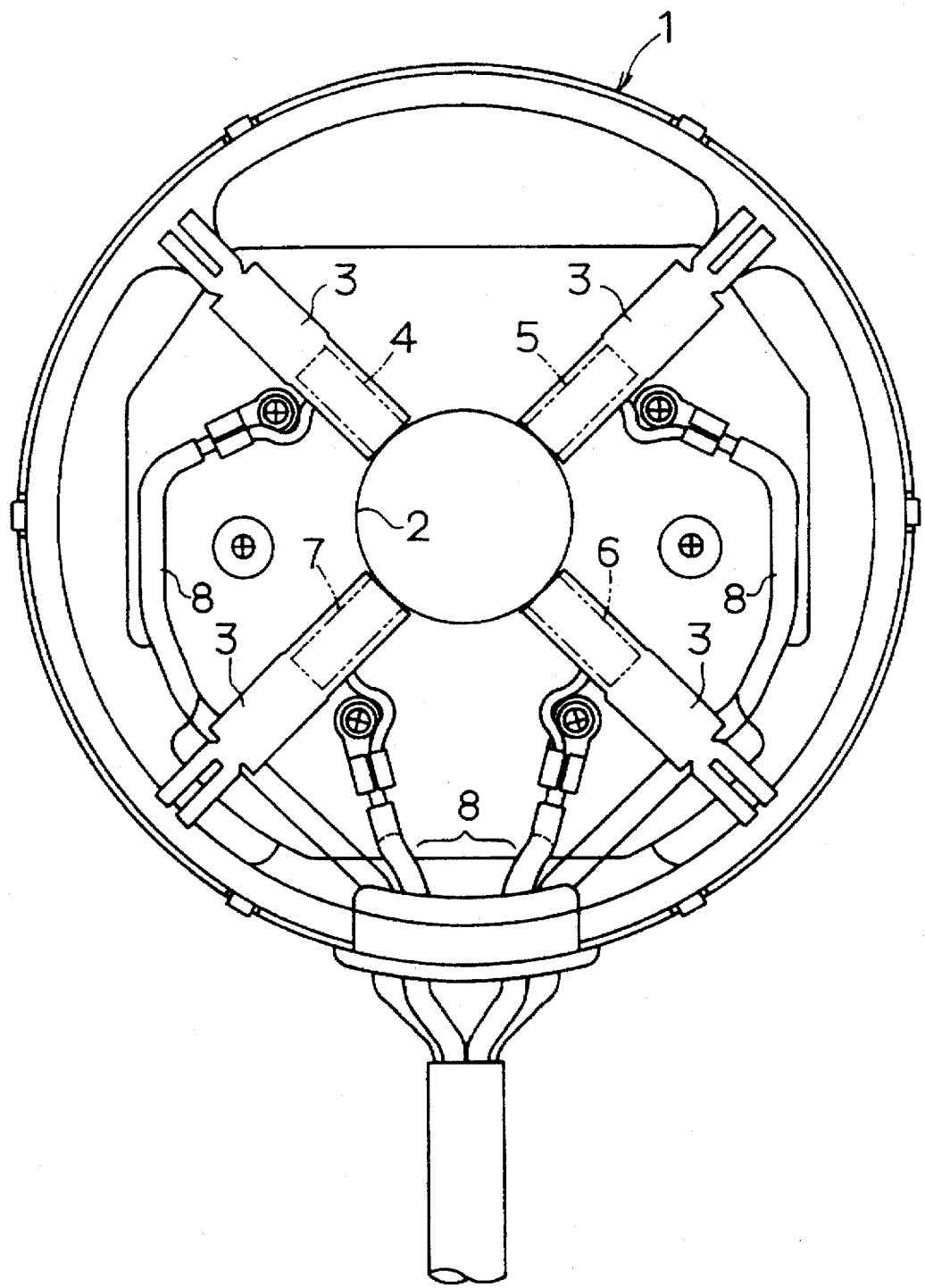
FIG. 1 is a schematic plan view illustrating an end plate of a motor having brush holders according to a first embodiment of the present invention.

FIG. 1 shows an upper surface of an end plate 1 of a DC motor (not shown) for driving a cooling fan for a radiator of an automobile. End plate 1 is integrally formed of synthetic resin and an axial hole 2 for receiving a commutator connected to an armature (not shown) therethrough is formed in the middle of end plate 1. Four brush holders 3 are formed at the outer peripheral side of axial hole 2 opposing thereto. Inside each brush holder 3, a first brush 7 and second brushes 4 to 6 are held in the direction of axial hole 2. Electrical wires 8 are connected to brushes 4 through 7 respectively and each wire 8 is extended outwardly from end plate 1.

Figures 2A, 2B, 2C:
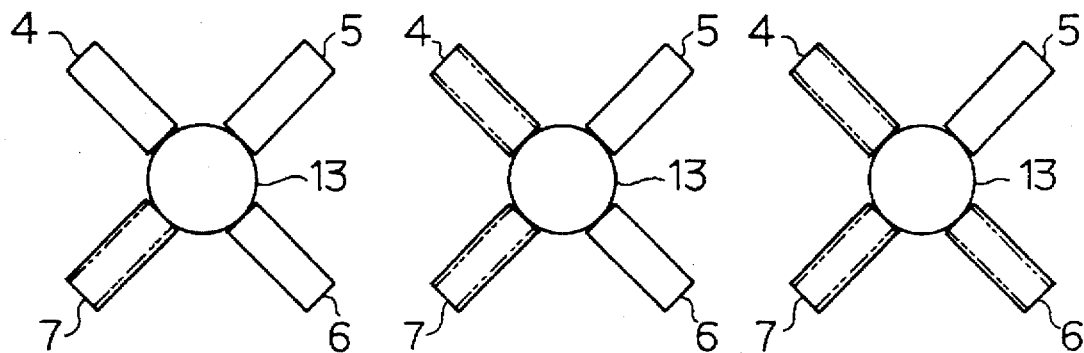
FIGS. 2A through 2C are schematic plan views illustrating brush structures according to the first embodiment.

As shown in FIG. 2A, second brushes 4 through 6 are formed to have an identical sliding contact area (a vertical cross section to the longitudinal direction in this embodiment) for slidably contacting the commutator. The sliding contact area of the first brush 7 only is formed to have an approximately twice as large area as the sliding contact area of the other three brushes 4 through 6. A size of brushes 4 through 6 in the plane is indicated by a two-dot and chain line in FIG. 2A. Thus, the size of brush 7 is larger compared with the size of the rest of brushes 4 through 7.

Figure 4:
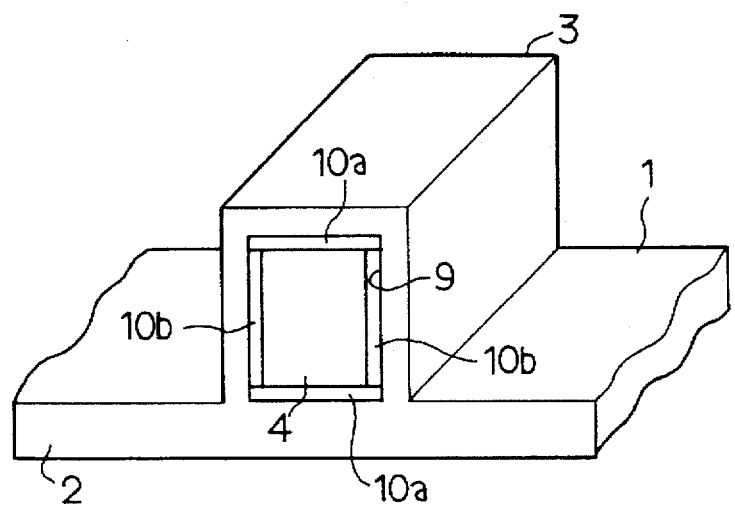
FIGS. 4 is a perspective view illustrating the brush holder.

A configuration of brush holder 3 for supporting brushes 4 through 6 therein is explained next. FIG. 4 shows a perspective view of one of brush holders 3 of end plate 1. Inside brush holder 3, a brush hole 9 for supporting each brush is formed. Shape and area of the vertical cross section to the longitudinal direction of brush hole 9 is formed to substantially correspond to those of a vertical cross section to the longitudinal direction of first brush 7. Therefore, when first brush 7 is accommodated in brush hole 9, first brush 7 becomes movable in the longitudinal direction only. The rest of brush holders 3 for brushes 4 through 6 are formed into the same configuration.

When second brushes 4 to 6, except first brush 7, are accommodated into brush holders 3, since each vertical cross section to the longitudinal direction of second brushes 4 through 6 is smaller than the cross section of brush hole 9, spacers 10a and 10b are provided to fill spaces formed between each second brushes 4 through 6 and brush hole 9. As a result, brush holders 3 can have the same configuration, and brushes 4 through 7 each having a different sliding contact area can be supported by simply providing spacers 10a and 10b.

Figure 3:
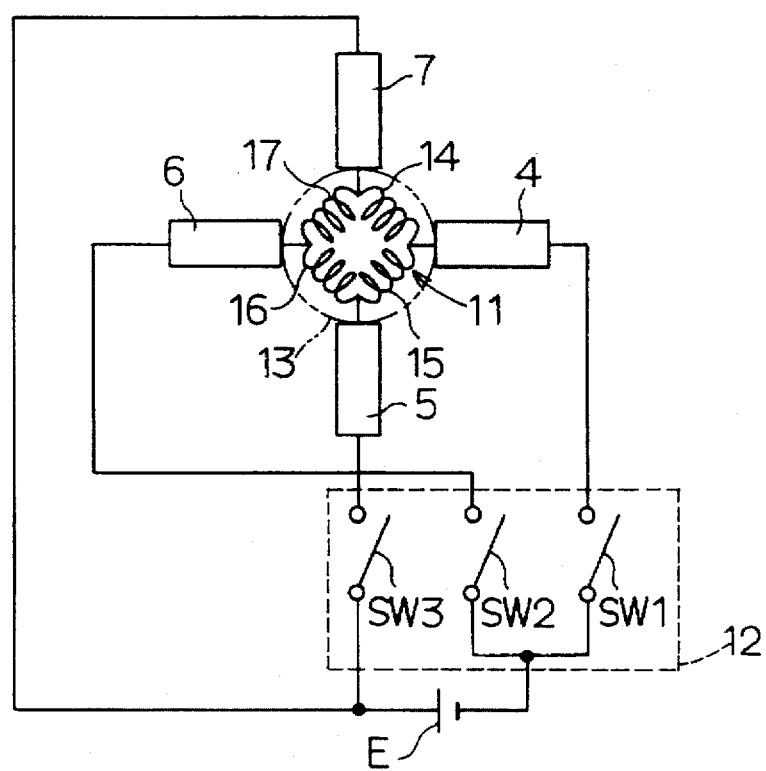
FIGS. 3 is an electric circuit diagram illustrating a switch controlling circuit including armature wirings.

FIG. 3 shows a state of connection of an armature winding 11, brushes 4 through 7, a switch controlling portion 12 and a battery E. Switches SW1 through SW3 are provided in switch controlling portion 12. The negative terminal of battery E is connected to a terminal of switch SW 1 and second brush 4 is connected to the other terminal of switch SW1. Similarly, the negative terminal of battery E is connected to a terminal of switch SW 2 and second brush 6 is connected to the other terminal of switch SW2. The positive terminal of battery E is connected to a terminal of switch SW 3 and second brush 5 is connected to the other end of switch SW3. First brush 7 is always connected to the positive end of battery E and each brush 4 through 7 is connected to commutator 13.

Armature winding 11 is connected to commutator 13. Armature winding 11 is comprised of four armature coils 14 through 17 connected in a loop shape as a whole, and each connecting portion of armature coils 14 through 17 is connected to commutator 13 respectively. Therefore, an armature circuit comprising armature coils 14 through 17 is connected to brushes 4 through 7.

Switch controlling portion 12 changes over and controls rotational speed of the motor into three levels, namely the lowest speed mode, medium speed mode and the highest speed mode. Switch controlling portion 12 controls to turn on switch SW1 only and to turn off switches SW2 and SW3 at the lowest speed mode (hereinafter Lo mode). As a result, each armature coil 14 through 17 is conducted between second brush 4 and first brush 7. This means that an armature circuit is formed by a parallel circuit connecting armature coil 14 in parallel with armature coils 15 through 17 connected in series. Therefore, an armature resistance of this armature circuit is 3r/4 with each resistance of armature coils 14 through 17 being set as r.

Switch controlling portion 12 controls to turn on switches SW1 and SW2 and to turn off switch SW3 only at the medium speed mode (hereinafter Me mode). As a result, an armature circuit is formed, between first brush 7 of the positive terminal and second brushes 4 and 6 of the negative terminal, by a parallel circuit connecting armature coil 14 with armature coil 17 in parallel. Therefore, an armature resistance of this armature circuit is r/2.

Switch controlling portion 12 controls to turn on all switches SW1 to SW3 at the highest speed mode (hereinafter Hi mode). As a result, an armature circuit is formed, between second brush 5 as well as first brush 7 of the positive terminal and second brushes 4 and 6 of the negative terminal, by a parallel circuit connecting armature coils 14 through 17 in parallel. Therefore, an armature resistance of this armature circuit is r/4.

Next, an operation of the first embodiment is explained.

When switch controlling portion 12 executes Hi mode in order to drive the radiator cooling fan at the highest speed, all switches SW1, SW2 and SW3 are turned on. As a result, the rotation of the motor is regulated by torque-rotational speed characteristics defined by the following expression.

$$N=(V/K1)-K2\cdot(r/4)\cdot T$$

wherein N is rotational speed, V is battery voltage, T is torque, and K1 and K2 are constants.

Also when switch controlling portion 12 executes Me mode in order to drive the cooling fan at the medium speed, switches SW1 and SW2 are turned on and switch SW3 is turned off. As a result, the rotation of the motor is regulated by torque-rotational speed characteristics defined by the following expression.

$$N=(V/K1)-K2\cdot(r/2)\cdot T$$

Further, when switch controlling portion 12 executes Lo mode in order to drive the cooling fan at the lowest speed, switch SW1 is turned on and switch SW2 and SW3 are turned off. As a result, the rotation of the motor is regulated by torque-rotational speed characteristics defined by the following expression.

$$N=(V/K1)-K2\cdot(3r/4)\cdot T$$

The higher the rotational speed mode becomes, the lower the armature resistance becomes and the larger the rotational speed to the torque becomes. An operating point of the motor at each mode is determined within a range satisfying the above expressions, and current to flow to the armature circuit in each mode is also determined. The motor is driven at the highest speed in Hi mode, at moderate speed in Me mode and the lowest speed in Lo mode.

The amount of electric current flowing to first brush 7 in Me mode or Lo mode increases against a current value flowing to second brush 5 in Hi mode. However, since the sliding contact area of first brush 7 is formed twice as large as that of second brushes 4 through 6, current density in first brush 7 becomes smaller than the same in Hi mode. As a result, heat quantity generated per unit volume in first brush 7 due to power loss in Me mode or Lo mode never exceeds heat quantity generated in Hi mode. Thus, temperature of first brush 7 in Me mode or Lo mode never rises above temperature of second brushes 4 through 6 in Hi mode. Therefore, wear speed of first brush 7 in Me mode or Lo mode becomes slower than that of second brushes 4 through 6 in Hi mode.

As described above, according to this embodiment of the present invention, the sliding contact area of first brush 7 conducted in Lo mode and Me mode is formed larger compared with the sliding contact area of second brush 5 conducted in Hi mode only. Therefore, even when the amount of electric current flowing to first brush 7 becomes large in Lo mode or Me mode, its current density is maintained at low level. Since the temperature of first brush 7 in Lo mode and Me mode is controlled to be lower than the temperature of second brush 5 in Hi mode, the wear speed of first brush 7 in Lo mode and Me mode is reduced to be slower than the wear speed of second brush 5 in Hi mode. As a result, an effective life of first brush 7 conducted in Lo and Me modes in addition to Hi mode can be extended to an effective life of second brush 5 conducted only in Hi mode. Therefore, effective lives of brushes 4 through 7 can be more equalized while keeping a total cost of brushes 4 through 7 minimum.

In this embodiment, only the sliding contact area of first brush 7 which is conducted both in Lo mode and Me mode is set larger. As shown in FIG. 2B, however, the sliding contact areas of brushes 4 and 7 both conducted in Lo mode in which a large amount of current flows, can be set larger. Also, as shown in FIG. 2C, the sliding contact area of second brushes 4, 6 and 7, excluding brush 5 conducted in Hi mode only, can be set larger. The effective lives of brushes 4 through 7 are further equalized by taking this construction.

(Second Embodiment)

A second embodiment realizing the present invention will be explained next based on FIGS. 5A through 5C. This embodiment differs from the first embodiment in that first brush 7 is replaced with a first brush 21. Therefore, elements having the same construction as in the first embodiment are denoted by the same reference numerals and respective explanation is eliminated for brevity.

Figures 5A, 5B, 5C:
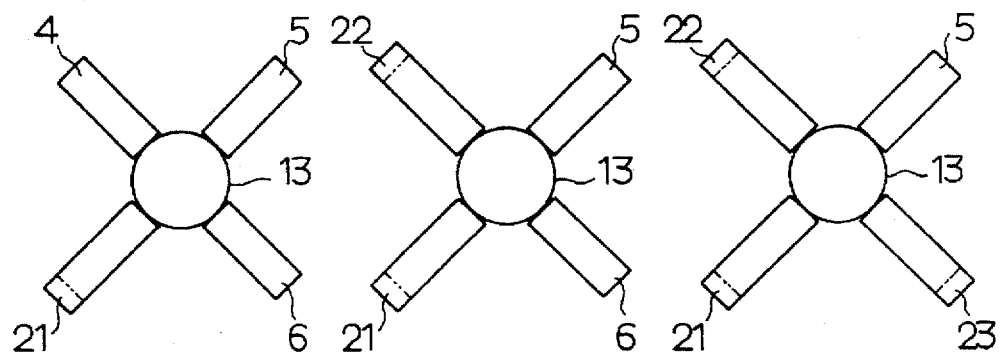
FIGS. 5A through 5C are schematic plan views illustrating brush structures according to a second embodiment.

As shown in FIG. 5A, first brush 21 has the same sliding contact area as the sliding contact area of second brushes 4 through 6. On the other hand, an effective wear length (a length practically usable in the total length of the brush) is set longer than that of second brushes 4 through 6. In FIG. 5A, a two-dot and chain line indicates the effective wear length of second brushes 4 through 6. Therefore, under the condition that the brush wear progresses at the same speed, a period of time before first brush 21 wears out is longer than a period of time before second brushes 4 through 6 wear out.

When the motor is driven in Me mode or Lo mode, a larger amount of current flows to first brush 21 than in high mode. As a result, temperature of first brush 21 rises higher due to power loss than temperature of second brushes 4 through 6 in Hi mode and its wear is accelerated. However, since the effective wear length of first brush 21 is set longer, it can be used till second brushes 4 through 6 become inoperable due to the wear. As a result, an equalization of effective lives of brushes 4 through 6 and brush 21 is achieved, keeping the total cost of brushes 4 through 6 and brush 21 minimum.

Thus, in this second embodiment, the same effects can be obtained as in the first embodiment.

In this embodiment, only the effective wear length of first brush 21 is set longer than that of second brushes 4 through 6. However, as shown in FIG. 5B, an effective wear length of a brush 22 conducted in Lo mode, and further as shown in FIG. 5C, an effective wear length of a brush 23 conducted in Me mode can be set longer in a similar way. In this case, the effective lives of the brushes can be further equalized.

(Third Embodiment)

A third embodiment realizing the present invention will be explained based on FIGS. 6A through 6C. This embodiment differs from the first embodiment in that first brush 7 is replaced with a first brush 31. Therefore, with regard to elements having the same construction as in the first embodiment, respective explanation is eliminated for brevity.

Figures 6A, 6B, 6C:
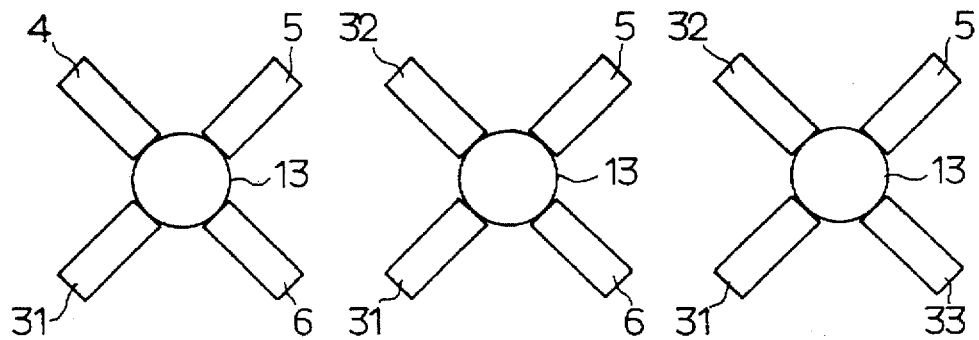
FIGS. 6A through 6C are schematic plan views illustrating brush structures according to a third embodiment.

As shown in FIG. 6A, first brush 31 is formed to have the same sliding contact area and effective wear length as other second brushes 4 through 6 have. On the other hand, first brush 31 is formed of a material having a larger specific resistance than that of a material of which second brushes 4 through 6 are formed. Therefore, contact resistance of first brush 31 with commutator 13 becomes larger than contact resistance of second brushes 4 through 6 with commutator 13.

When the motor is driven in Me mode or Lo mode, a larger amount of current flows to first brush 31 than the same flows in Hi mode. However, since the specific resistance of first brush 31 is larger, contact resistance of first brush 31 with commutator 13 is larger than contact resistance of brushes 4 through 6 with commutator 13. As a result, since a resistance commutation is effected at the armature coil which is short-circuited by second brush 4 and first brush 31, generation of brush sparks at the times of making/breaking contact of first brush 31 with/from commutator 13 is repressed. Therefore, an early wear of first brush 31 is prevented because the wear of brush 31 due to the brush sparks is repressed as well.

Therefore, in this third embodiment, the same effects can be obtained as in the first embodiment.

In this embodiment, only the specific resistance of first brush 31 conducted in Lo mode and Me mode is set larger than the same of second brushes 4 to 6. However, as shown in FIG. 6B, a specific resistance of a brush 32 conducted in Lo mode, and further as shown in FIG. 6C, a specific resistance of a brush 33 conducted in Me mode can be set larger in a similar way. In this case, the effective lives of the brushes can be further equalized.

The present invention is not limited to the above-described embodiments, but can be modified in the following ways.

(1) In the first embodiment, in order to equalize the effective lives of brushes 4 through 6 further, brush 4 and 6 can be formed to have a sliding contact area sized between the sizes of the sliding contact areas of brush 7 and brush 5. Moreover, brush 4 and brush 6 can be formed to have differently sized sliding contact areas respectively.

(2) In the second embodiment, in order to equalize the effective lives of brush 5 and brushes 21 through 23 further, brush 22 and 23 can be formed to have effective wear length sized between the effective wear length of brush 21 and the effective wear length of brush 5. Moreover, brush 22 and brush 23 can be formed to have different effective wear lengths respectively.

(3) In the third embodiment, in order to equalize the effective lives of brush 5 and brushes 31 through 33 further, brush 32 and 33 can be formed to have a specific resistance whose value is set between the specific resistance of brush 31 and the specific resistance of brush 5. Moreover, brush 32 and brush 33 can be formed to have different specific resistances respectively.

(4) The present invention can be applied not only to a motor having a quadruple-pole quadruple-brush structure but also to a motor having more than 5 brushes. In this case, the rotational speed of the motor can be changed into more than three levels.

As described above, according to the present invention, the equalization of the wear of the brushes can be obtained by preventing an early wear of the specific brush, without the use of a complicated conduction controlling device.

The present invention as described herein is not limited to the disclosed embodiments, but can be modified in a number of other ways without departing from the scope and spirit of the invention. All such changes and modifications are to be understood as being included within the scope of the present invention, as defined by the appended claims.

What is claimed is:

1. A brush structure for a motor driven by a power source to operate at a plurality of predetermined motor rotational speeds, comprising:
   a first brush for connection with the power source at a time of motor rotation;
   a plurality of second brushes for connection with the power source selectively at the time of said motor rotation; and
   an armature circuit formed by a parallel circuit for varying an armature resistance thereof to control the motor rotational speed of the motor;
   said parallel circuit being formed by a plurality of armature coils between said first brush and said second brushes selectively connected to said power source by way of changing the number of said second brushes connected to said power source, said first brush being connected to the power source during operation of the motor at all of said predetermined motor rotational speeds, the connection of the first brush and selective second brushes to the power source being unchanged during operation of the motor at each predetermined rotational speed;
   said first brush having a sliding contact area that is larger than the sliding contact area of one of said second brushes which is to be connected to said power source only at a time when all of said second brushes are connected to said power source so that uneven wear of the first brush as compared to the second brushes during operation of the motor results in substantially equalized wear of the first brush and the second brushes at the end of each brush life.

2. A brush structure according to claim 1, wherein said sliding contact area of said first brush is twice as large as said sliding contact area of said one of second brushes.

3. A brush structure according to claim 1, wherein a sliding contact area of another of said second brushes is larger than that of said one of second brushes.

4. A brush structure according to claim 3, wherein said sliding contact area of said another of second brushes is equal to that of said first brush.

5. A brush structure according to claim 3, wherein said sliding contact area of said another of second brushes is smaller than that of said first brush.

6. A brush structure according to claim 1, wherein sliding contact areas of said second brushes are different from each other.

7. A brush structure for a motor driven by a power source to operate at a plurality of predetermined motor rotational speeds, comprising:
   a first brush for connection with the power source at a time of motor rotation;
   a plurality of second brushes for connection with the power source selectively at the time of said motor rotation; and
   an armature circuit formed by a parallel circuit for varying an armature resistance thereof to control the motor rotational speed of the motor;
   said parallel circuit being formed by a plurality of armature coils between said first brush and said second brushes selectively connected to said power source by way of changing the number of said second brushes connected to said power source, said first brush being connected to the power source during operation of the motor at all of said predetermined motor rotational speeds, the connection of the first brush and selective second brushes to the power source being unchanged during operation of the motor at each predetermined rotational speed; and
   an effective wear length of each brush corresponding to an usable length of the brush, the effective wear length of said first brush being longer than that of one of said second brushes which is to be connected to said power source only at a time when all of said second brushes are connected to said power source so that uneven wear of the first brush as compared to the second brushes during operation of the motor results in substantially equalized wear of the first brush and the second brushes at the end of each brush life.

8. A brush structure according to claim 7, wherein an effective wear length of another of said second brushes is longer than that of said one of second brushes.

9. A brush structure according to claim 8, wherein said effective wear length of said first brush is equal to that of said another of second brushes.

10. A brush structure according to claim 8, wherein said effective wear length of said another of said second brushes is shorter than that of said first brush.

11. A brush structure according to claim 7, wherein effective wear lengths of said second brushes are different from each other.

12. A brush structure for a motor driven by a power source to operate at a plurality of predetermined motor rotational speeds, comprising:
   a first brush for connection with the power source at a time of motor rotation;
   a plurality of second brushes for connection with the power source selectively at the time of said motor rotation; and
   an armature circuit formed by a parallel circuit for varying an armature resistance thereof to control the motor rotational speed of the motor;
   said parallel circuit being formed by a plurality of armature coils between said first brush and said second brushes selectively connected to said power source by way of changing the number of said second brushes connected to said power source, said first brush being connected to the power source during operation of the motor at all of said predetermined motor rotational speeds, the connection of the first brush and selective second brushes to the power source being unchanged during operation of the motor at each predetermined rotational speed; and a specific resistance of said first brush being larger than that of one of said second brushes which is to be connected to said power source only at a time when all of said second brushes are connected to said power source so that uneven wear of the first brush as compared to the second brushes during operation of the motor results in substantially equalized wear of the first brush and the second brushes at the end of each brush life.

13. A brush structure according to claim 12, wherein a specific resistance of another of said second brushes is larger than that of said one of second brushes.

14. A brush structure according to claim 13, wherein said specific resistance of said first brush is equal to that of said another of second brushes.

15. A brush structure according to claim 13, wherein said specific resistance of said another of said second brushes is smaller than that of said first brush.

16. A brush structure according to claim 12, wherein specific resistances of said second brushes are different from each other.

17. A brush structure for a motor having an armature coil circuit energized by a power source to operate the motor at a plurality of predetermined motor rotational speeds, comprising:

a first brush for constant connection with the power source during operation of the motor of all of said predetermined rotational speeds; and a plurality of second brushes for selective connection with the power source to vary said armature coil circuit for a motor speed control, one of said second brushes being connected the least number of times during motor rotation, the connection of the first brush and selective second brushes to the power source being unchanged during operation of the motor of each predetermined rotational speed;

said first brush having a first wear-related parameter different from a second wear-related parameter of said one of said second brushes so that wear of said first brush is equalized to the wear of said one of said second brushes so that uneven wear of the first brush as compared to the second brushes during operation of the motor results in substantially equalized wear of the first brush and the second brushes at the end of each brush life.

18. A brush structure according to claim 17, wherein said first and second wear-related parameter includes at least one of a cross sectional area which contacts a commutator of said motor, a longitudinal length and a specific resistance.

19. A brush structure for a motor having a commutator and driven by a power source to operate selectively at first, second and third rotational speeds, comprising:

a first brush and a second brush provided in sliding contact with the commutator and kept connected to said power source when the motor is operated at any one of the first to the third rotational speeds;

a third brush provided in sliding contact with the commutator and kept connected to said power source together with the first and the second brushes only when the motor is operated at the second and the third rotational speeds; and a fourth brush provided in sliding contact with the commutator and kept connected to said power source together with the first to the third brushes only when the motor is operated at the third rotational speed;

the first and the second brushes having a wear-related parameter different from that of the third and the fourth brushes so that variations in brush wear among the first to the fourth brushes are minimized.

20. A brush structure according to claim 19, wherein the wear-related parameter includes a surface area of sliding contact with the commutator, the first and the second brushes having surface areas that are larger than that of the third and fourth brushes.

* * * * *